March 26, 1963  M. J. TIMMERMAN ETAL  3,082,775
SHAKER-CLEANER ASSEMBLY
Filed Nov. 17, 1961  4 Sheets-Sheet 1
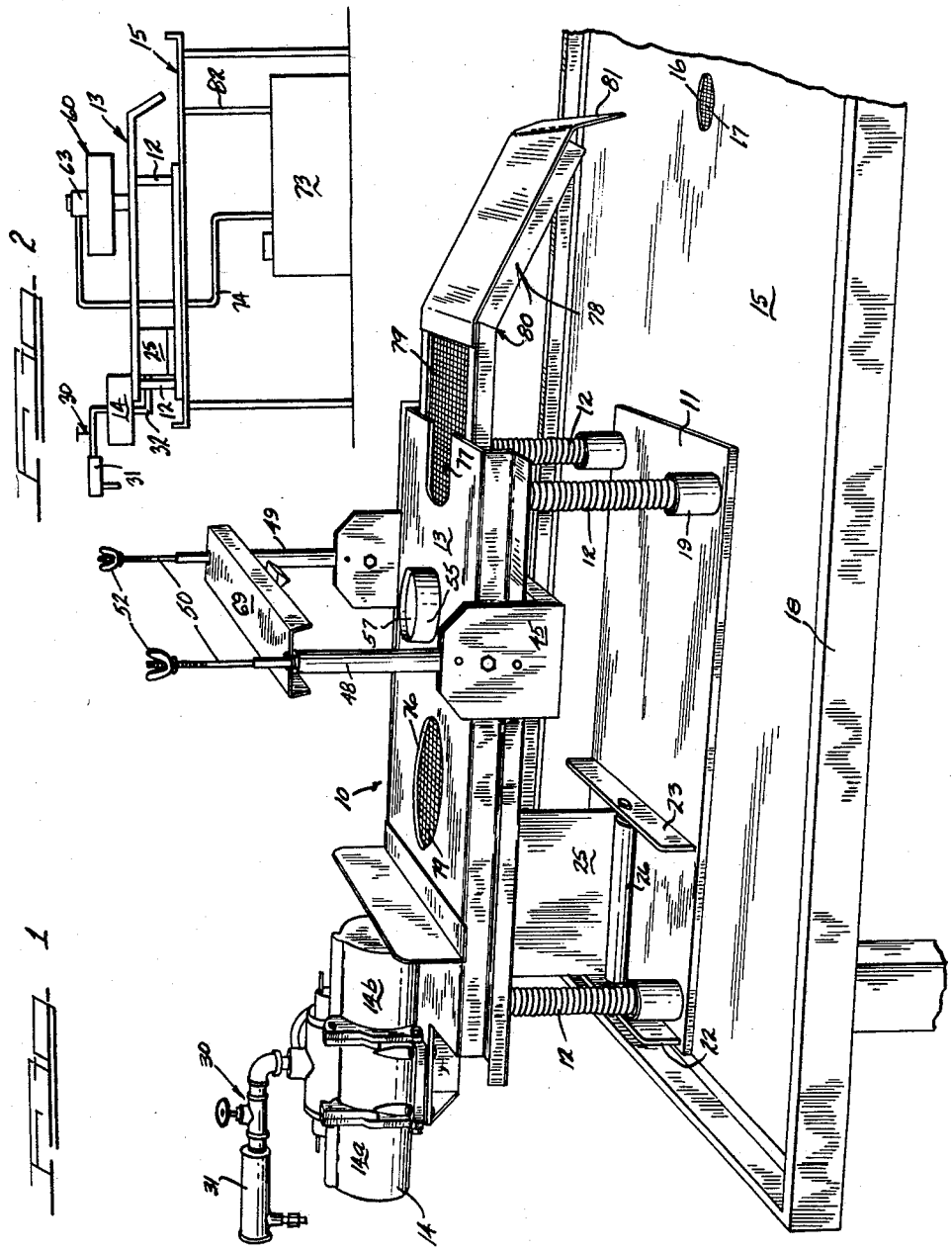
INVENTORS
Merle J. Timmerman
William F. Behm
BY
Hill, Sherman, Meroni, Gross & Simpson
ATTORNEYS March 26, 1963 M. J. TIMMERMAN ETAL 3,082,775
SHAKER-CLEANER ASSEMBLY
Filed Nov. 17, 1961 4 Sheets-Sheet 2
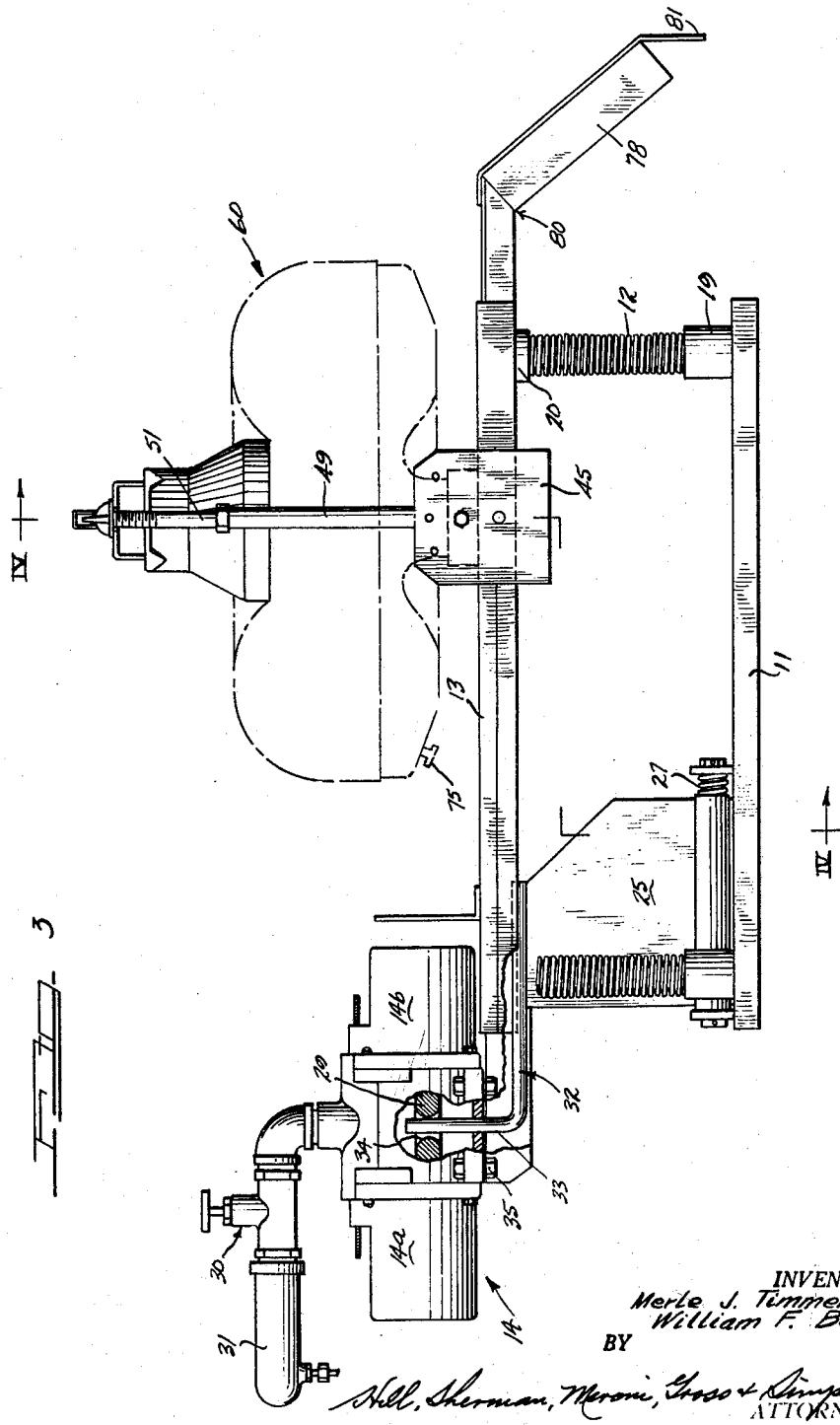
INVENTORS
Merle J. Timmerman
William F. Behm
BY
ATTORNEYS

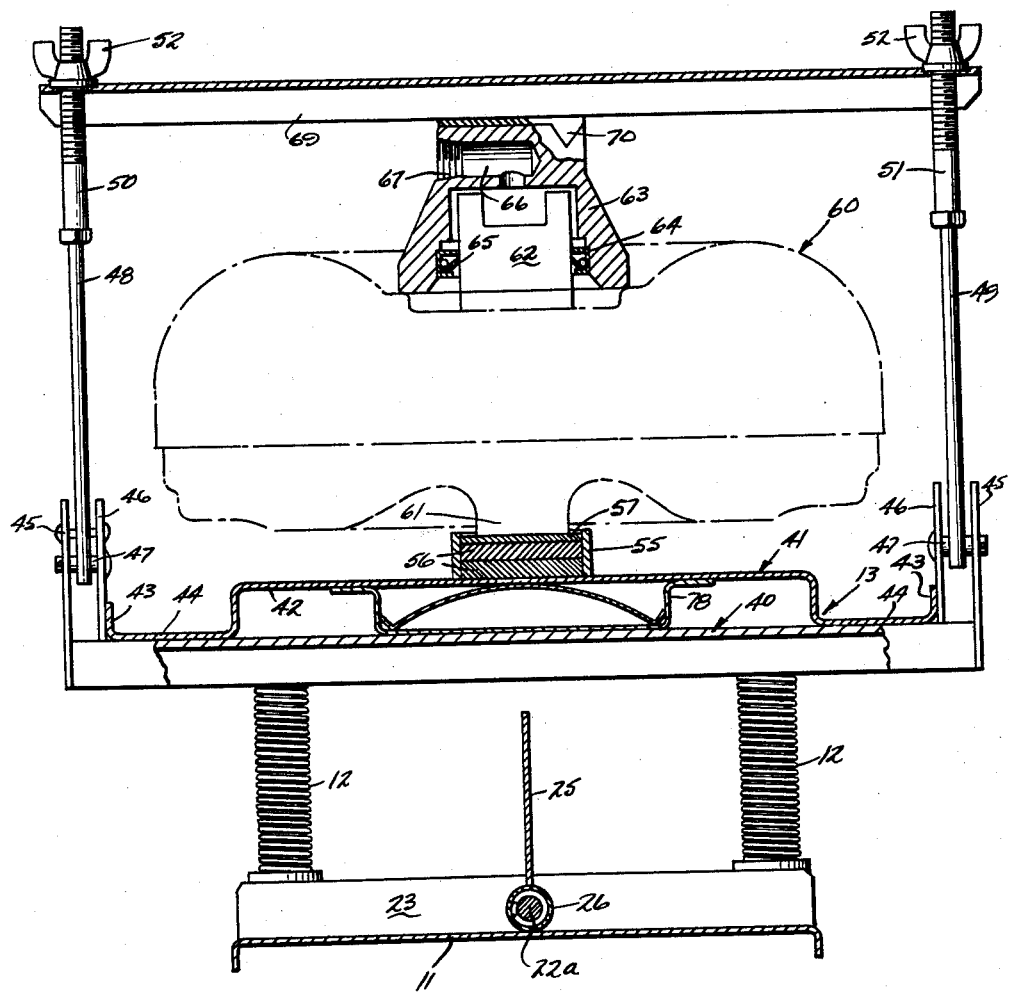

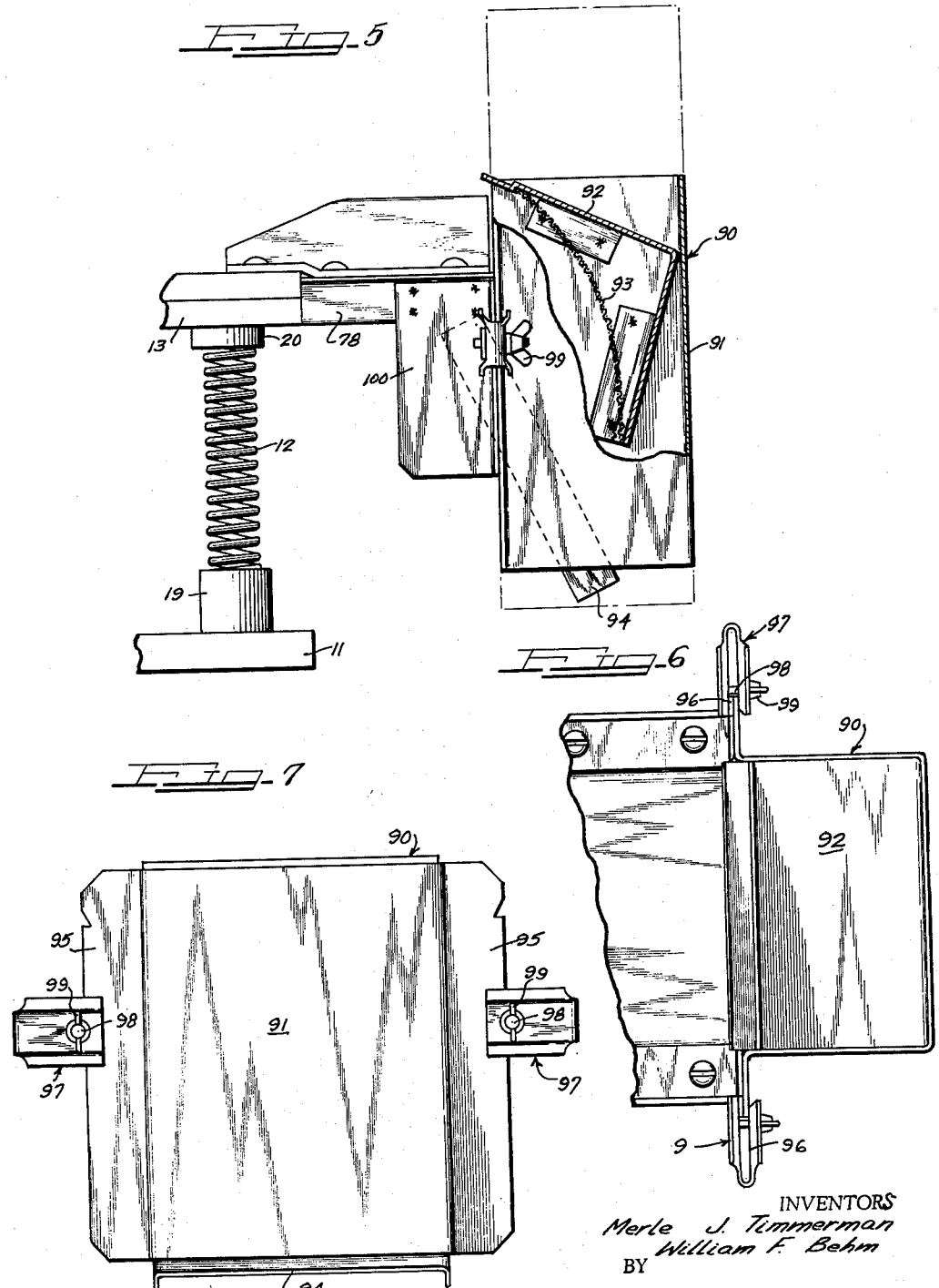

United States Patent Office 3,082,775
Patented Mar. 26, 1963

3,082,775
SHAKER-CLEANER ASSEMBLY
Merle J. Timmerman, Williamsville, and William F. Behm, Marilla, N.Y., assignors to Houdaille Industries, Inc., Buffalo, N.Y., a corporation of Delaware
Filed Nov. 17, 1961, Ser. No. 153,122
9 Claims. (Cl. 134—111)

This invention relates to shaker-cleaner assemblies and more particularly relates to a mechanism for vigorously shaking a vessel while liquid is being circulated therethrough. Our invention has particular application for flush cleaning hydraulic torque converter housings and other permanently closed hollow vessels but may be employed to perform various other functions as will hereinafter be pointed out.

Many mechanical assemblies are presently being so manufactured that the working parts thereof are permanently encased within a housing. The parts will be assembled in a two-part housing and then the housing parts will be welded or otherwise permanently secured together. This procedure is nowadays frequently followed in manufacturing torque converter assemblies.

Subsequently, however, if the converter becomes malfunctional, it is practically impossible for a serviceman to restore the converter to a proper operational condition so that many such malfunctioning converters must be replaced. In a great many instances, converter replacement would not be necessitated if the serviceman were able to remove sludge, chips, dirt and the like from the converter. The presence of such foreign particles in the converter housing may cause severe damage to the parts encased within the housing and their removal from the converter by a serviceman while he is working on a related repair job will often prevent severe damage to the working parts of the converter, caused by such foreign particles. In addition, it is particularly damaging to the working parts of a transmission to be exposed to particle carrying oil. The transmission may generally be disassembled, repaired and cleaned, but such a procedure is practically fruitless if no means is provided for cleaning out the converter assembly to which the transmission must again be connected.

In order to prevent damage to the working parts of permanently sealed mechanical units and to other units with which the sealed units are associated, we have devised a mechanism for flush cleaning the interiors of such units in a manner which is much more effective than those flush cleaning methods previously employed and which will be effective to remove practically all foreign particles from the interior of the housing so as to prevent part damage caused by the presence of such foreign particles.

Essentially, our invention consists in the provision of a plate which is resiliently mounted on a support by a plurality of helical spring legs. A motor interconnects the plate with the support and is operative to vigorously cycle or vibrate the plate within a generally horizontal plane. Due to the fact that the plate is mounted on the support by helical spring legs, the plate tends to oscillate some from side to side although its basic vibrational movement is reciprocable in a longitudinal direction. A distinct advantage of our assembly resides in the freedom of the system to give way to lateral forces, such as might be caused by off-center positioning of the center of gravity of the payload. The superposition of these lateral forces on the principal longitudinal driving force results in a vigorous compound motion highly desirable in such an assembly and the lateral forces, which would otherwise simply be wear forces, are employed to great advantage.

A pair of arms are pivotally connected to each side of the plate and extend upwardly therefrom. The pivotal axis of the arms is transverse to the longitudinal dimension of the plate and the arms are free to pivot when the plate vibrates so that the arms will swing vigorously to and fro as the plate vibrates. A resilient member or cushion is affixed to the upper surface of the plate and serves to receive one end of a unit which is to be flush cleaned, such as a torque converter. A bar extends between the two upright arms and is tightened down on the arms by wing nuts to hold the converter against the cushion. By mounting the converter in this fashion, the converter will swing to and fro, pivoting about the cushion as the plate is vibrated. Means are provided to adjust the vertical location of the pivoting axis of these arms in order to keep this height in proper relationship to the top of the object supporting cushion which can be raised to provide sufficient clearance. Thus, a proper ratio of the lever length to the clamping height of the object can be established which is essential for optimum motion and for preventing excessive motion.

While the shaker assembly above described is vigorously shaking the converter in this manner, means are provided for circulating a clear filtered liquid through the converter. In order to provide a means for carrying off the liquid which has been circulated through the converter, we have mounted a channel-forming member on the under surface of the plate which forms a trough. The plate is apertured in portions thereof overlying the trough and liquid is directed through these apertures into the trough. We have found that an effective means of preventing splashing of the liquid as it flows from the converter to the trough is to provide a screen over the apertures in the plate so that the liquid must flow through the screens to the trough. Incidentally, of course, the screens may be effective to filter out relatively large foreign particles. The outer end of the trough is angled downwardly toward the support or the table upon which the unit is mounted and has a hood pointing down toward the table which is positioned in the path of flow of the liquid and this hood is effective to direct the liquid from the trough to the table in a curtain-like stream so that splashing of the liquid as it strikes the table is also effectively prevented.

Preferably, but not by way of limitation, the liquid which is passed from the converter and through the trough will be directed to the reservoir from which liquid is withdrawn which is to be directed to the converter. The same liquid can thus be used over and over again so long as suitable means are provided for screening the liquid after it has passed through the converter to effectively filter out foreign particles.

As we have already indicated, the shaker-cleaner unit of the present invention may have great utility in applications other than that above described. For instance, a liquid filled container could be mounted on the vibrating plate with small parts contained therein to provide a means for shaker-cleaning those parts. The vigorous shaking of the container resulting from its mounting on the vibrating plate will be much more effective in cleaning these parts than the usual method of emersing the parts in an immovable liquid filled container.

From the foregoing, it will be understood that a principal object of our invention relates to the provision of a shaker assembly which is effective to vigorously shake an object mounted thereon.

Another object of our invention resides in the provision of a shaker-cleaner assembly which includes means for pivotally mounting a unit on the vibrating plate.

A still further object of our invention is directed to the provision of a shaker-cleaner assembly employing means for pivotally mounting a unit on the vibrating plate and for circulating liquid through that unit and effectively carrying liquid from the unit.

A still further object of our invention is to provide an adjustment of the vertical location of the pivoting axis of the clamping levers in order to keep this height in proper relationship to the top of the object supporting cushion which can be raised or lowered to provide sufficient clearance. Thus, a proper ratio of the lever length to the clamping height of the object can be established which is essential for optimum motion and for preventing excessive motion.

A further and important object of our invention is directed to the provision of means for preventing splashing of spent liquid passing from the unit being cleaned and for filtering that liquid to remove any foreign particles present therein.

These and other objects of the invention will become apparent from time to time as the following specification proceeds and with reference to the accompanying drawings, wherein:

FIGURE 1 is a pictorial view of a shaker-cleaner assembly constructed in accordance with the principles of our invention;

FIGURE 2 is a diagrammatic view of the shaker-cleaner assembly illustrated in FIGURE 1 and including the means for circulating liquid through the converter mounted on the shaker plate;

FIGURE 3 is a side elevational view of a shaker-cleaner assembly constructed in accordance with our invention and showing a torque converter in broken lines mounted on the shaker plate;

FIGURE 4 is a vertical sectional view of the shaker-cleaner assembly shown in FIGURE 3 which is taken along lines IV—IV of FIGURE 3;

FIGURE 5 is a side elevational, partially sectional view of a modified form of our invention;

FIGURE 6 is a fragmental plan view of the modified form of our invention shown in FIGURE 5; and FIGURE 7 is a fragmental end view of the modified form of the invention shown in FIGURE 5.

Referring initially to FIGURE 1, the shaker unit 10 includes generally a supporting base 11, a plurality of helical spring legs 12, a plate 13, and a motor 14 mounted on the plate 13. The base 11 is mounted on table 15 which has its top dipped downwardly slightly to an aperture 16 covered by a screen 17. An upwardly extending flange 18 is formed around the base of the table 15 to confine liquid therein for reasons which will hereafter be understood.

The supporting base 11 has a plurality of short tubular members 19 welded or otherwise rigidly secured thereto at the corners thereof which are arranged to receive the lower end portions of the compression springs 12. Likewise, short tubular members 20 are welded or otherwise rigidly secured to the plate 13 on the under surface thereof and adjacent the corners thereof which receive the upper end portions of the springs 12. It is important to understand that the springs 12 constitute the only supporting means interconnecting the supporting base 11 and the plate 13 so that the plate 13 is free to reciprocate or oscillate with respect to the base 11.

As best viewed in FIGURES 1 and 3, a pair of flanges 22 and 23 extend upwardly from the supporting base 11 and are rigidly affixed thereto as by welding or the like. A vertical member 25, having a tubular lower end portion 26 formed integrally therewith, is mounted between the upright flanges 22 and 23. A shaft 22a extends through the tubular portion 26 and has its opposite ends rigidly mounted in the opposed upright flanges 22 and 23. A helical spring 27 is interposed between one end of the upright member 25 and the flange 23 to bias the opposite end of the upright member 25 against the flange 22.

The motor 14 may be of the air pressure operated type having pistons disposed within opposed cylinders 14a and 14b which are each operably connected with a motion translation rod 29. Air may be supplied to the cylinders under a controlled rate of flow by means of a valve 30 positioned in a conduit 31. This motor is of a type which is well known in the art and so is not here described in detail. It will be understood however that, when operating, the motion translation rod 29 and pistons remain fixed by virtue of fixed rod 32 (if clearance in aperture 34 is ignored) and thus the motor casing assembly 14 and the attached plate 13 are forced to rapidly move reciprocably; the rapidity and force of movement being determined by the volume and pressure of fluid flowing through the conduit 31 as controlled by the valve 30.

An L-shaped rod 32 is rigidly affixed to the upper end portion of the upright member 25 as by welding or the like and has its upstanding leg portion 33 positioned within an aperture 34 formed centrally within the rod 29. The motor 14 is bolted to the plate 13 by means of a plurality of bolts 35 so that as the casing of the motor 14 moves reciprocably relative to the translation rod 29 the motor, and consequently the plate 13 to which it is connected, will also be moved reciprocably. Since the sole supporting connection between the plate 13 and the base support 11 comprises the spring members 12, reciprocation of the motor casing 14 relative to the motion translation rod will tend not only to reciprocate the plate 13 along its longitudinal axis but also to effect some oscillation thereof from side to side.

As seen in vertical section, the plate 13 is a two-part structure and includes a bottom section 40 and an upper section 41 which has a longitudinally extending raised portion 42 that is spaced from the section 40. The longitudinal edges of the section 41 are bent upwardly as at 43 to define liquid troughs 44. Pairs of spaced brackets 45 and 46 are rigidly connected to opposed longitudinal edges of the plate 13 and have pins 47 extending therethrough which serve to pivotally mount a pair of upstanding arms 48 and 49, respectively. The pivotal axis of the arms 48 and 49 can be located by pin 47 at the lower or upper holes in the brackets 45 and 46 as desired. This provides the proper ratio of the lever length to the clamping height of the object in order to provide a means for effecting optimum motion and for preventing excessive motion.

The arms 48 and 49 have threaded studs 50 and 51, respectively, mounted thereon upon which wing nuts 52 are, in turn, threadedly mounted.

A metal ring 55 is permanently secured to the upper section 41 of the plate 13 intermediate the pins 47. A pair of cushions 56 are mounted in juxtaposition to one another on the upper surface of the upper section 41 within the ring 55 and a metal disk 57 is freely mounted on the uppermost cushion 56.

FIGURE 3 and 4 illustrate a permanently closed torque converter housing 60 having a shaft receiving end 61 positioned on the disk 57 within the ring 55. The opposite end 62 of the converter 60 is shown as having a fitting 63 mounted thereover. The fitting 63 includes a sealing unit 64 which has a resilient seal 65 disposed therein to provide a fluid-tight connection between the end portion 62 of the converter housing 60 and the fitting 63. A passageway 66 having an internally threaded outer end portion 67 is formed within the fitting 63 and provides a means for directing liquid into the converter. It will be understood that the opposite ends of different models of converters may be of different configuration but that one end thereof such as the end 62 will include an open passage leading to the interior of the converter housing. Accordingly, fittings such as the fitting 63 will be provided having internal configurations conforming to the configuration of the ends of the converter housings upon which they are to be mounted.

A bar 69 has apertures in opposed ends thereof fitting over the studs 50 and 51 and extends over the fitting 63 to provide a means for holding the converter casing 60 on the disk 57. Centrally affixed to the bar 69 is a depending element 70 which conforms to the uppermost portion of the fitting 63 so as to positively position the fitting 63 along the bar 69.

By tightening down the wing nuts 52 on the bar 69 the converter casing 60 will be held securely against the cushioned washer 57.

From the foregoing it will be understood that when the motor 14 is operating and the plate 13 is vigorously vibrating, the converter housing 60 will rock forward and backward due to the fact that the arms 48 and 49 to which the bar 69 is connected, are pivotally mounted with respect to the plate 13.

Referring now to FIGURE 2, we have diagrammatically illustrated a liquid reservoir 73 having a flexible tube 74 leading therefrom which has its opposite end threadedly connected (FIGURE 4) to the fitting 63 so that liquid can be communicated from the reservoir 73 to the passageway 66 within the fitting 63. Means will be provided, of course, for pumping liquid up through the tubing 74 under pressure. It will also be understood that while the tubing 74 need not be entirely flexible, at least some portion thereof must be flexible so that the connection thereof with the fitting 63 will not interfere with the vibratory and rockable movement of the converter casing 60.

In accordance with our invention, liquid will be pumped up through the tubing 74 and fitting 63 and thence into the interior of the converter casing 60. We have not here illustrated the liquid flow passages through the converter because, of course, our invention, although particularly adapted for flush cleaning permanently closed converter housings, has application in cleaning many other mechanical units having much different flow passageway systems.

The vibratory and rockable movement of the converter casing 60 during the time when the liquid is being forced into the casing under pressure will be effective to remove nearly all foreign particles contained within the casing.

Different units will of course have different means for draining the interiors thereof but in the present instance, the converter casing 60 has a drain plug 75 which will be removed during the flush cleaning operation. As a result, liquid will be circulated through the converter casing 60 and will then flow from the drain which is normally plugged by the plug 75.

To provide an effective means for carrying off the liquid flowing from the converter casing 60 while still preventing splashing of the liquid as it strikes the plate 13 or the table 15, we have provided apertures 76 and 77 in the plate 13. A channel-forming member 78, illlustrated particularly in FIGURES 1 and 4, is connected to the under surface of the upper section 41 of the plate 13 and extends from one end of the plate 13. A screen 79 is mounted along the upper open end of the channel-forming member 78 and will effectively prevent splashing of liquid falling thereon. In addition of course the screen will filter out large foreign particles from the liquid.

The outer end portion of the channel-forming member angles downwardly as at 80 and terminates in a hood 81 which extends downwardly at an even greater angle and which is disposed in the flow path of liquid running through the channel-forming member. When liquid flows down the inclined portion 80 of the channel-forming member and strikes the downwardly extending hood 81 it will be spread out and will fall from the hood 81 in a curtain-like stream to the take 15. This liquid will then flow through the screened aperture 16 and will be returned via a tube 82 to the reservoir 73 from whence it can again be circulated through the converter casing 60.

Of course, the bar 69 can be employed to hold many other units than converters in position on the plate 13. We have also devised a container which essentially comprises a covered liquid-containing box having means on each side thereof which permit connection of the box to the upright arms 48 and 49. This box may contain numerous small parts which will be effectively cleaned as the plate 13 and the box vibrates. Means may or may not be provided for circulating liquid through this box, as desired.

In the embodiment of our invention illustrated in FIGURES 5, 6, and 7, there is shown an adjustable splash guard 90 which can be connected to the channel-forming member 78 in place of the downwardly angled portion of the channel-forming member and which is a more effective means for directing the spent fluid from the torque converter to the drain table.

The splash guard comprises generally an open ended three-sided housing 91 which has a right angularly configurated channel piece 92 seated therein as shown in FIGURE 5 to direct fluid from the channel-forming member 78 downwardly through the housing and thence to the drain table. The channel member 92 has an arcuately shaped screen 93 mounted therein. A member 94 is angularly positioned within the housing 91 to catch fluid flowing through the housing and to direct the same in a curtain-like stream from the housing to drain table.

The housing 91 has opposed laterally extending flanges 95 formed integrally therewith which flanges are slidably received within channel grooves 96 formed in brackets 97. Threaded studs 98 extend through the brackets 97 and have wing nuts 99 mounted on the outer end thereof which can be tightened down to grip the flanges 95 within the channel grooves 96.

The brackets 97 are connected to and formed integrally with downwardly extending plates 100 which are welded or otherwise rigidly secured to the generally horizontally extending channel-forming member 78.

In this manner the housing 91 can be raised to the position shown in broken lines in FIGURE 5 or can be lowered from the position shown therein merely by loosening the wing nuts 99, moving the housing 91, and thereafter tightening down the wing nuts again.

Such an arrangement has been found desirable particularly in those instances in which a converter or other unit to be cleaned expels fluid in a horizontal rather than in a downward direction. In such instances, the housing 91 can be raised so that the horizontally flowing stream of fluid expelled from the converter will be impinged upon the screen 93. The screen 93 will practically eliminate any splashing of the fluid which might otherwise occur and the fluid will then strike the right angularly configurated member 92, flow off that member onto the angularly extending member 94, and then flow onto the drain table. Under ordinary circumstances, the hood can be positioned as shown in FIGURE 5 and fluid will then merely run off the channel-forming member 78 and onto the member 94 and thence onto the drain table.

In any event, the housing 91 can be placed in any desired position so that the screen 93 is situated in the flow path of fluid which is rapidly expelled from the converter and the hooded tortuous flow path through which the fluid must flow from the channel-forming member 78 or the converter itself to the drain table will practically eliminate any splashing of the fluid.

It will be understood that this embodiment of the invention has been used for illustrative purposes only and that various modifications and variations in the present invention may be affected without departing from the spirit and scope of the novel concepts thereof.

We claim as our invention:

1. A shaker-cleaner comprising a support, a plate, and resilient means interconnecting said support and plate, motor means interconnecting said support and plate and vibrating said plate, a liquid trough carried by said plate, means pivotally mounting a unit to be flush cleaned upon said plate, means circulating liquid through said unit and directing same to said trough, and means directing liquid flowing from said trough in a curtain-like stream.

2. A shaker-cleaner comprising a support, a plate, helical spring legs interconnecting said support and plate and constituting the sole means for supporting said plate upon said support, motor means interconnecting said support and plate and vibrating said plate, a liquid trough carried by said plate, means mounting a unit to be flush cleaned upon said plate, means circulating liquid through said unit and directing same to said trough, means screening the liquid flowing from said unit to said trough, and means directing liquid flowing from said trough in a curtain-like stream.

3. A shaker-cleaner comprising a support, a plate spaced above said support, resilient legs interconnecting said support and plate, motor means interconnecting said support and plate and vibrating said plate, a channel-forming member connected to and disposed on the under surface of said plate, at least one screened aperture formed within said plate and above channel-forming member, means mounting a unit to be flush cleaned atop said plate, means circulating liquid through said unit and directing same through said aperture, and means directing liquid carried by said channel-forming member in a curtain-like stream to said support.

4. A shaker-cleaner comprising a support, a plate, and resilient means interconnecting said support and plate, motor means interconnecting said support and plate and vibrating said plate, a liquid trough carried by said plate, a resilient member mounted on said plate, means pivotally mounting a unit to be flush cleaned upon said resilient member, and means circulating liquid through said unit and expelling same to said trough.

5. A shaker-cleaner comprising a support, a plate, and resilient means interconnecting said support and plate, motor means interconnecting said support and plate and vibrating said plate, a liquid trough carried by said plate, a resilient member mounted on said plate, at least one arm pivotally connected to and extending upwardly from said plate, means forming an extension from said arm for connecting a unit to be flush cleaned to said arm and pivotally mounting same upon said plate, and means circulating liquid through said unit and expelling same to said trough.

6. A shaker-cleaner comprising a support, a generally horizontally extending plate, and resilient means interconnecting said support and plate, motor means interconnecting said support and plate and vibrating said plate in a generally horizontal plane, a liquid trough carrier by said plate, means pivotally mounting a unit to be flush cleaned upon said plate about a generally horizontally extending pivotal axis transverse to the direction of longitudinal movement of said plate, means limiting the degree of pivotal movement of said means, means circulating liquid through said unit and directing same to said trough, and means directing liquid flowing from said trough in a curtain-like stream.

7. A shaker-cleaner comprising a support, a generally horizontally extending plate spaced above said support, resilient legs interconnecting said support and plate, motor means interconnecting said support and plate for vibrating said plate through a generally horizontal plane, a channel-forming member connected to and disposed on the under surface of said plate, at least one screened aperture formed within said plate and above said channel-forming member, means pivotaly mounting a unit to be flush cleaned upon said plate about a generally horizontally extending axis transverse to the direction of longitudinal vibratory movement of said plate, means circulating liquid through said unit and directing same through said aperture, and means directing liquid carried by said channel-forming member in a curtain-like stream to said support.

8. A shaker-cleaner comprising a support, a generally horizontally extending plate spaced above said support, resilient legs interconnecting said support and plate, motor means interconnecting said support and plate for vibrating said plate through a generally horizontal plane, a channel-forming member connected to and disposed on the under surface of said plate, at least one screened aperture formed within said plate and above said channel-forming member, means pivotally mounting a unit to be flush cleaned upon said plate about a generally horizontally extending axis transverse to the direction of longitudinal vibratory movement of said plate, means circulating liquid through said unit and directing same through said aperture, means directing liquid carried by said channel-forming member in a curtain-like stream to said support, and means circulating liquid through said unit and expelling same through said aperture to said trough.

9. A shaker-cleaner comprising a support, a plate, resilient means interconnecting said support and plate, motor means interconnecting said support and plate and cyclically moving said plate in one plane, a screen mounted on said plate, a resilient member mounted on said plate, means freely pivotally mounting a unit to be flush cleaned upon said resilient member, and means circulating liquid through said unit and directing same through said screen.

References Cited in the file of this patent

UNITED STATES PATENTS

| | | |
|---|---|---|
| 2,284,671 | Meinzer | June 2, 1942 |
| 2,601,411 | McLauchlan | June 24, 1952 |